June 8, 1926.
W. A. HARRIS
1,588,107
ADJUSTABLE PRESSURE AIR SERVICE APPARATUS
Filed Jan. 31, 1925   3 Sheets-Sheet 1
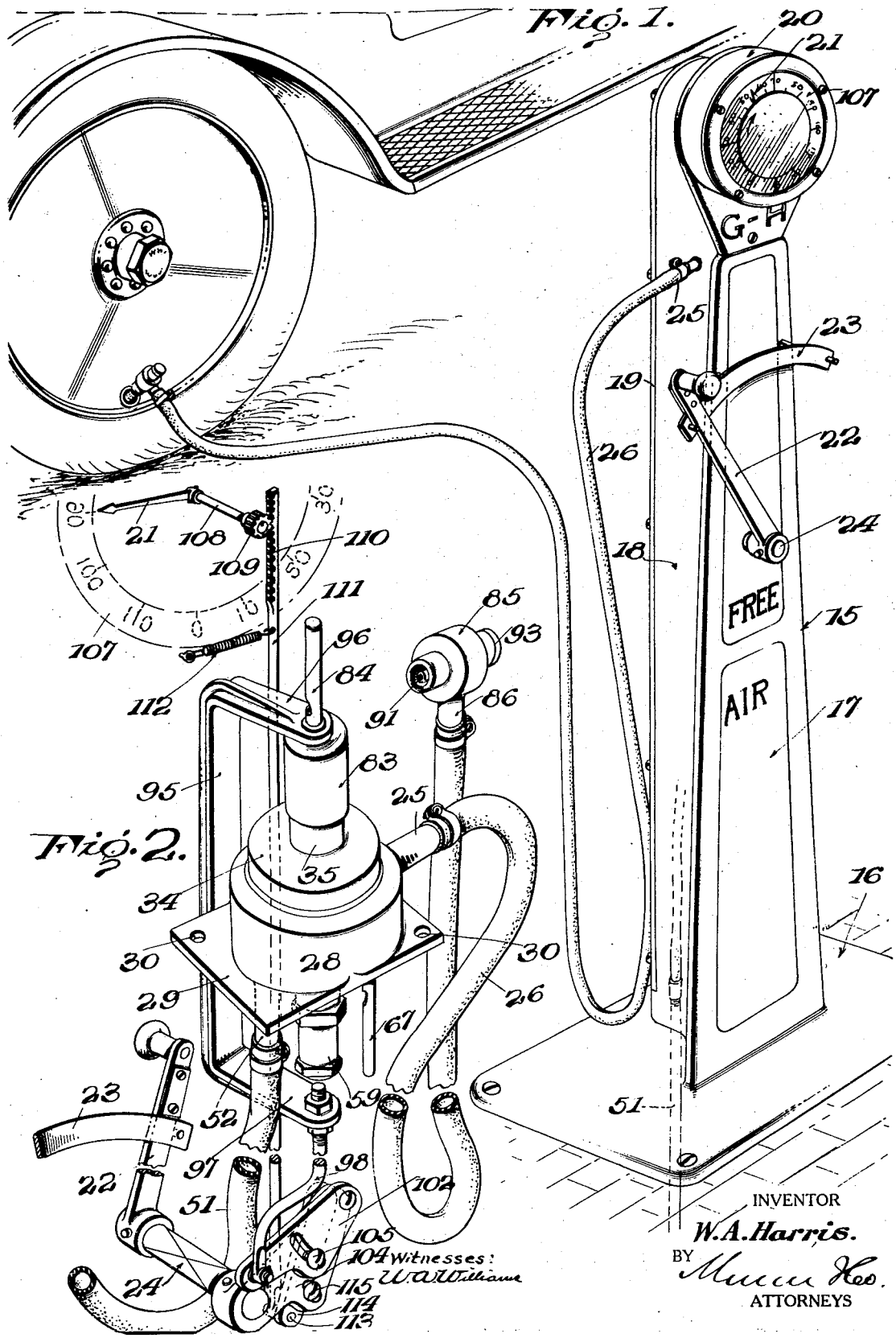

June 8, 1926.
W. A. HARRIS
1,588,107
ADJUSTABLE PRESSURE AIR SERVICE APPARATUS
Filed Jan. 31, 1925  3 Sheets-Sheet 2
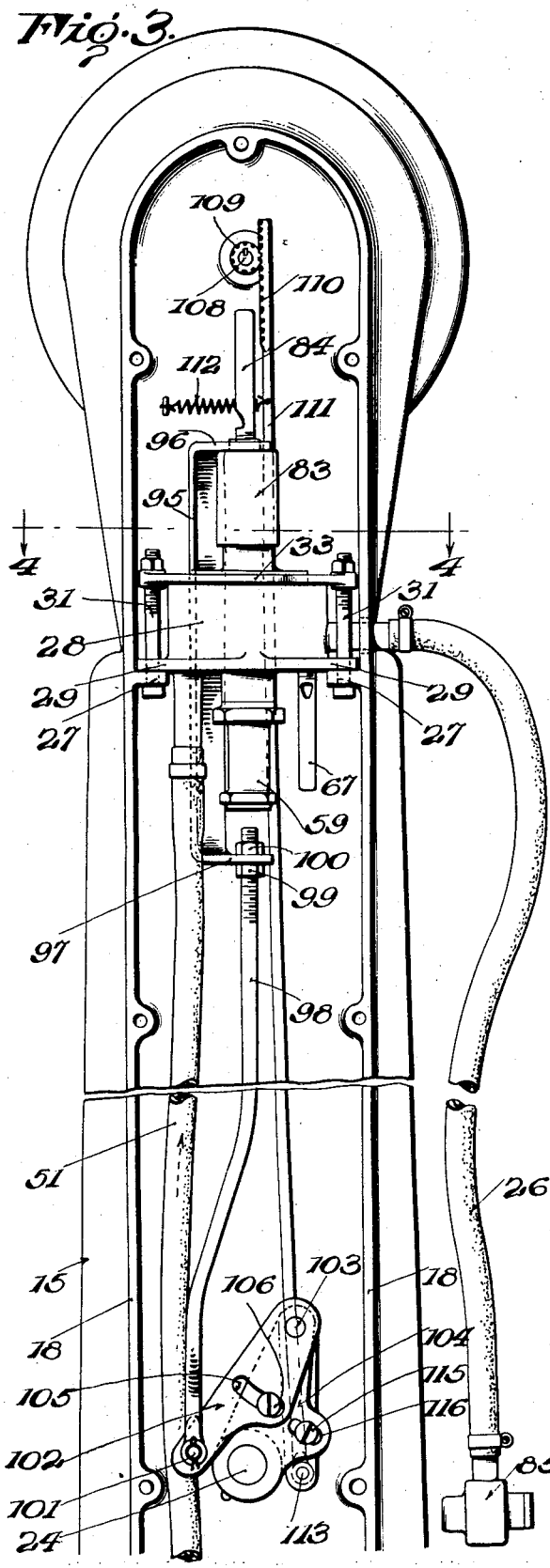
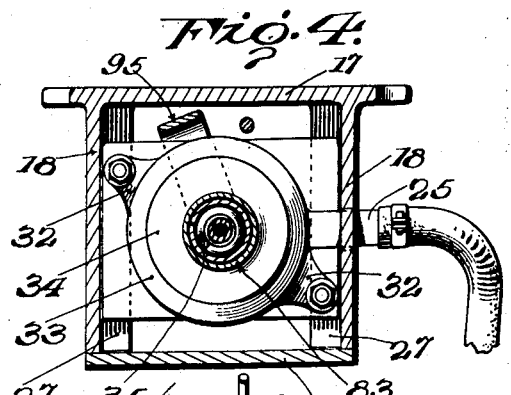
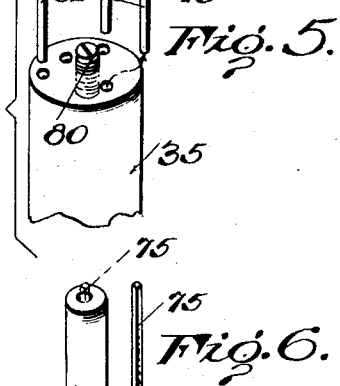
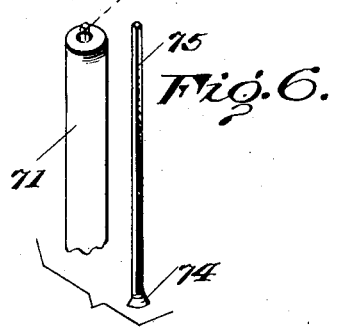
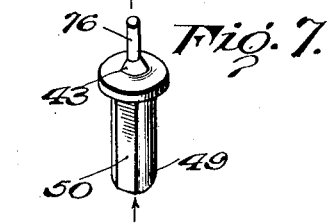
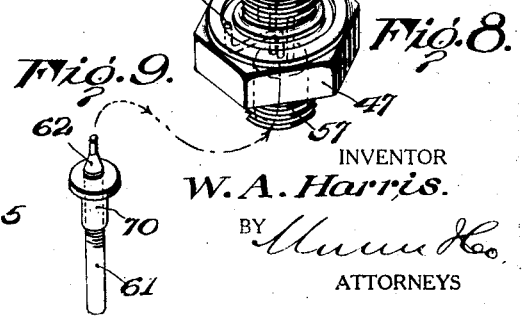
INVENTOR
W. A. Harris.
BY
ATTORNEYS

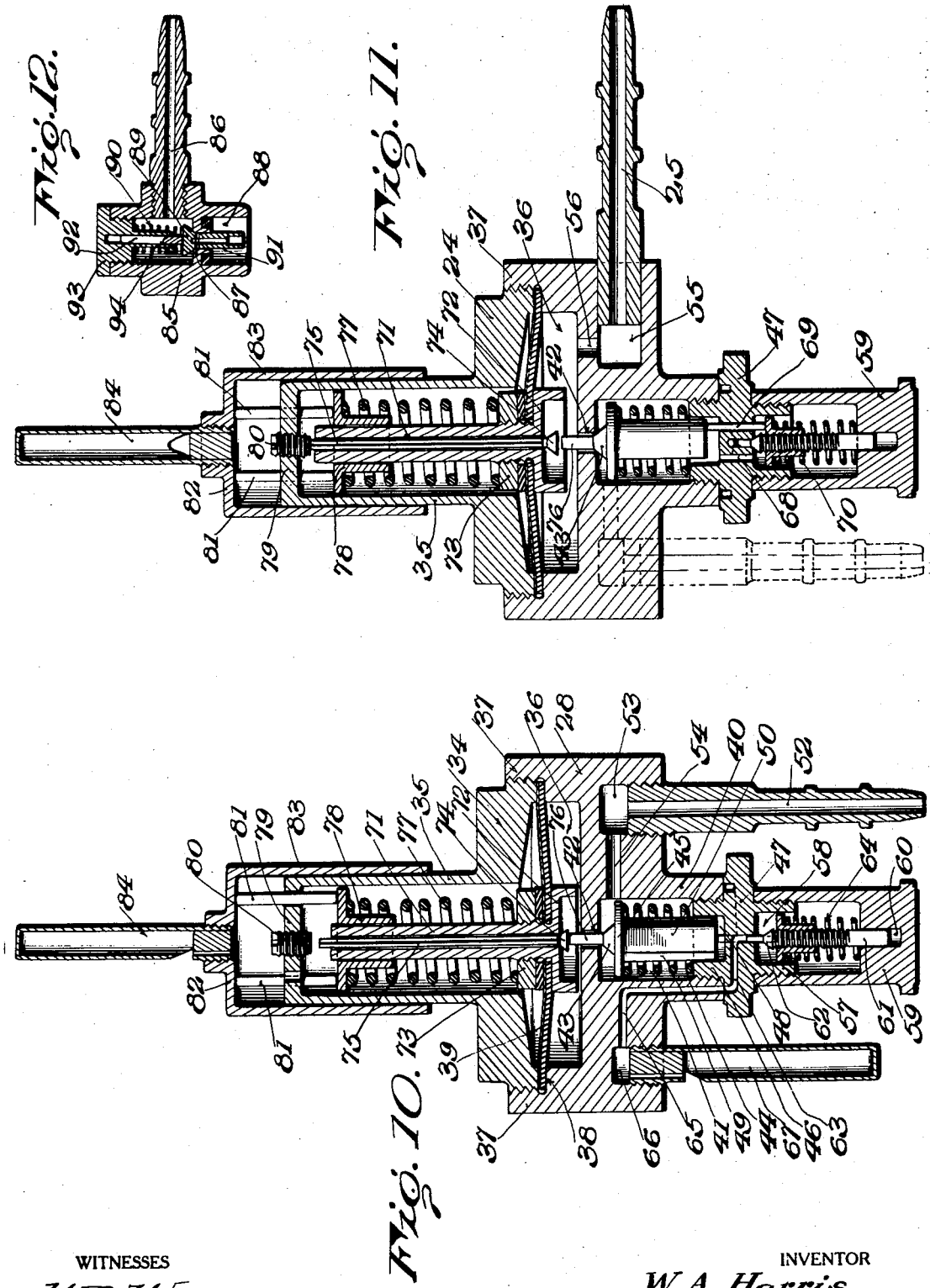

Patented June 8, 1926.

1,588,107

UNITED STATES PATENT OFFICE.

WILLIAM A. HARRIS, OF GREENVILLE, SOUTH CAROLINA, ASSIGNOR TO G. & H. TIRE CHUCK GAUGE COMPANY, OF GREENVILLE, SOUTH CAROLINA, A CORPORATION OF SOUTH CAROLINA.

ADJUSTABLE-PRESSURE AIR-SERVICE APPARATUS.

Application filed January 31, 1925. Serial No. 6,143.

My present invention relates generally to apparatus for the power inflation of pneumatic tires and the like, ordinarily accomplished from a power supply of air, as for instance an air compresser, through a flexible air line or hose having at its free or service end a chuck or head provided with a valve therein which opens when the chuck or head is pressed onto the exposed end of a tire valve stem.

Apparatus of this general type is now in use, and it is well known to be necessary in most instances to leave the service chuck or head of the air line or hose on the tire valve stem until the operator considers sufficient pressure has been introduced into the tire to inflate the latter to the desired or required number of pounds per square inch. The operator then verifies his guess, if at all, by the subsequent use of the ordinary hand pressure gage, and this operation consumes considerable time as it is generally necessary to subsequently reapply the chuck for the introduction of more pressure or to let out some of the pressure where too much air has been previously introduced. The operation is moreover attended in most instances with doubtful results, even where the ordinary hand pressure gage is utilized to verify the pressure, inasmuch as such gages are known to be of decreasing efficiency as the requisite pressures of tires is lowered with the introduction of the present day balloon and balloon type tires.

My invention has to do in particular with that type of apparatus wherein an upright stand supports the means by which the controlling mechanism is adjusted for the purpose of initially setting the pressure capable of being subsequently supplied to one or more tires, through one or more service lines or hose. Apparatus of this particular character such as now used, ordinarily operate with signals indicating when the pressure in the tire has reached the previously set pressure of the air control apparatus, so that the service line or hose may be then removed to another tire without waste of time. Such apparatus at the present time involve considerable cost, depend for their saving of time upon signals which frequently fail, and commonly lack the definite accuracy which is to be desired of them.

My invention proposes air service apparatus of the above character, and has for its primary object the provision of a simple inexpensive arrangement or combination of arrangements which will be continuously and uniformly effective and efficient and will be accurate with both low and high pressures.

A further object is the provision of an apparatus of the above character which will provide not only for inflation of a tire where the pressure of the tire is below the previously set pressure of the apparatus, but will also provide for deflation of the tire where the pressure of the tire is over the previously set pressure of the apparatus, and which will not only bring the tire to the previously set pressure of the apparatus, whether the tire lacks the requisite pressure or exceeds the requisite pressure, but will signal both loading and unloading of tire pressure and unfailingly indicate when the set pressure has been reached.

A still further object is the provision of an air service apparatus which may be readily set up in use and easily and quickly placed in operative condition in the first instance, and just as readily regulated and adjusted for different pressures, throughout a wide range thereof, and a still further object is the provision of an apparatus in which the air control means are easily demountable and readily accessible for purposes of repair and the substitution of parts.

My invention also aims to provide an apparatus which in its ordinary operation and use is substantially foolproof and safe alike from unskilled and unwarranted tampering.

These and other objects of my present invention as well as the resulting advantages thereof will clearly appear in the course of the following description with reference to the accompanying drawings, forming a part of this specification and illustrating my invention, and wherein:—

Figure 1 is a perspective view of the complete apparatus, illustrating its practical application, Figure 2 is a detail perspective view of certain parts thereof including the air control device, removed from the stand or upright, Figure 3 is an enlarged partial rear elevation, with the rear wall or plate of the casing or stand removed, Figure 4 is a horizontal section taken substantially on the line 4—4 of Figure 3, Figure 5 is a detail perspective view of the housing of the main or diaphragm controlling spring with the connecting members for varying the effective pressure of the spring, Figure 6 is a detail perspective view of the diaphragm tube with its deflation controlling valve, Figure 7 is a detail perspective view of the main or feed valve member, Figure 8 is a similar view of the seating ring of the signal control valve, Figure 9 is another similar view of the signal control valve, Figure 10 is an enlarged vertical section taken diametrically through the pressure control device.

Figure 11 is a similar view through the pressure control device, taken at right angles to Figure 10, and Figure 12 is a detail vertical longitudinal section through the valve stem engaging chuck or head of the feed or service line or hose.

Referring now to these figures, and particularly to Figures 1 to 4 inclusive, the general apparatus includes an upright stand or casing seen at 15 in Figures 1, 3 and 4, preferably rising from a substantial base 16 and preferably having its front wall 17 integral with its side walls 18 so that an unbroken structure is presented to front view in order to lessen the danger as far as is possible of unwarranted tampering or possible adjustment or manipulation of the adjusting parts by unskilled persons. The rear wall 19 is separated and secured by any suitable fastening members to the rear edges of the side walls and may in practice be locked thereto in addition to ordinary fastenings to prevent access to the interior of the casing except by those entitled to such access. The upper end of the stand is formed with a dial casing 20 having therein a dial as indicated in Figure 1, which in practice, is graduated say from zero to one hundred and twenty (120) pounds, or more, and is traversed by a pointer 21, adjustment of which upon the dial to the desired pressure is brought about by a swinging lever 22 mounted upon the front of the casing in conjunction with an arcuate guide bracket 23 and secured at its lower end upon the forwardly projecting end of a transverse shaft 24.

From one side wall 18 of a casing at a point below the dial a laterally projecting nipple 25 extends and upon this nipple one end of the flexible air line or hose 26 is secured, the opposite end of the air line or hose being joined to a valve stem engaging chuck or head which, as I will hereinafter show, has means for actually opening the valve of a tire valve stem when applied thereto, in order that air pressure may be either supplied to the tire or permitted to exhaust therefrom.

Within the stand 15, the air control mechanism is mounted upon internal ribs 27 of the casing sides 18 as best seen in Figures 3 and 4, the upright cylindrical body or casing 28 of this mechanism having lower flanges 29 which seat upon the ribs 27 and which has openings 30 as in Figure 2 for the reception of vertical clamping bolts 31, the upper ends of the latter of which pass through the diametrically extended and apertured ears 32 of a ring 33 which, as best seen in Figure 4, seats around and upon the upper edge of the cylindrical body 28 and also around the lower enlarged portion 34 of the upright cylindrical spring housing 35.

As shown more particularly in Figures 10 and 11, the body 28 of the air control mechanism has an upwardly opening chamber 36 and an upper reduced and internally threaded edge 37 which forms between the same and the wall of the chamber 36 an annular shoulder 38 for the reception of the edge of a diaphragm 39 which extends across the chamber 36 and is clamped upon the shoulder by the lower enlarged portion 34 of the main spring housing, which enlargement 34 is externally threaded around its lower portion to engage the internal threads of the upper edge 37 of the body.

The body 28 also has an axially bored and axially disposed depending extension 40, whose bore 41 is in communication with the chamber 36 through an aperture 42 centrally of the base of the bore and the base of the chamber, this aperture forming at its edge in the base of the bore 41 a seat against which the main or feed valve 43 seats with a ground joint. Valve 43 is normally held seated by a spring 44 one end of which engages the valve flange 45 and the other end of which engages one reduced portion 46 of a coupling ring 47, the said reduced portion of which is threaded as shown within the lower or outer end of the bore 41. This coupling ring has a bearing cavity 48 axially of its reduced portion 46 to receive one end of the enlarged cylindrical extension 49 of the valve 43, mounted axially through the bore 41 and flattened at one side as at 50 for a purpose which will be presently described.

The air control mechanism is supplied with air by a feed line 51 leading upwardly in the stand 15 from a suitable source of compressed air supply, as for instance an air compressor of any of the well known types now in use, the upper end of this air feed line 51 being connected within the upper portion of the stand 15, to a depending nipple 52 whose upper end is threaded into a lower vertical bore 53 of the body or casing 28 of the air control mechanism, located at one side of the lower axial bore 41 and connected with the upper portion of the latter by a lateral feed channel 54 as plainly seen in Figure 10, so that the passage of air from the feed line 51 is thus normally prevented from passing into the chamber 36 below the diaphragm 39 by virtue of the presence of the valve 43 seated around the lower end of the opening 42 by its spring 44. The body or casing 28 also has a laterally opening bore 55 as shown in Figure 11, in which one end of the outstanding nipple 25 is threaded, this latter nipple connecting to the service line or hose 26 as above described. The bore 55 is in communication with the chamber 36 by a vertical port 56.

The coupling ring 47 just above mentioned has a lower reduced and threaded portion 57 axially bored as at 58, and this lower reduced portion receives one end of an axially bored plug 59 of cylindrical form having in its lower flanged end an axle bearing aperture 60 for the lower end of the stem 61 of a whistle valve 62, the latter having an upper reduced stem projecting into the lower end of an angular channel 63 around the lower end of which the valve 62 is adapted to normally seat under tension of its controlling spring 64. The angular channel 63 is formed in the coupling ring 47 with its lower end centrally of the bore 58 and with its upper outer end adapted to register with an angular channel 65 of the body or casing 28, whose upper outer end is in communication with a downwardly opening bore 66 in which the upper end of a whistle tube 67 is threaded or otherwise fixed. By referring to Figure 11, it will be noted that in addition to the angular bore 63, the central portion of the coupling ring 47 has a pair of openings 68 vertically therethrough and in communication between its lower bore 58 and its upper bore 48, one of said openings 68 receiving a pin 69 whose upper end is engaged by the lower end of the enlarged cylindrical extension 49 of the main feed valve 43, and whose lower end bears upon the upper flange of an adjusting sleeve 72 threaded on the valve stem 61. The upper end of the controlling spring 64 of the whistle valve engages the flanged sleeve 70 and a lower end of this spring has bearing against the base of the bore of plug 59 and it is obvious that by virtue of the pin 69, downward movement of the main feed valve 43 off of its seat will cause downward unseating movement of the whistle valve 62 so that the channels 63 and 65 will thus be opened for the passage of air pressure to the whistle tube 67. In other words, whenever the main feed valve is unseated for the passage of air pressure from the feed line to the chamber 36 of the body or casing 28, and as long as this valve is unseated, the whistle valve 62 will be unseated and thus the signal constituted by the whistle 67 will be sounded. The sleeve 70 forms an effective means of adjustment so that through the pin 69 simultaneous unseating of valves 43 and 62 will be assured.

Extending upwardly through the center of the diaphragm 39 is a valve tube 71, whose lower head 72 engages the lower surface of the diaphragm around the central opening of the latter and whose portion immediately above the diaphragm is externally threaded to receive a washer and clamping nut 73 by which the central portion of the diaphragm is rigidly clamped to the lower head 72 of the tube. Moreover, the lower end of the bore of this tube forms therearound a valve seat for the reception of an unloading valve 74 whose upright stem 75 projects through the bore of the valve tube 71 and extends at its upper end slightly beyond the upper end of the valve tube. The valve 74 moreover forms an engaging element for contact in the downward flexure of diaphragm 39 with the upper end of a pin 76 extending upwardly from the main feed valve 43 through the opening 42 and above the base of the pressure chamber 36.

The clamping nut 73 forms an abutment for the lower end of the main controlling spring 77 of the diaphragm, this being a coil spring disposed around the valve tube 71 within the upright cylindrical spring housing 35, with its upper end engaging a flanged sleeve 78 which is slidable upon the upper portion of the valve tube 71 and in fact throughout the length of this tube within the range of compression of the controlling spring 77.

The upper end of the spring housing 35 is closed as at 79 except for a central opening in which a plug 80 is threaded, the lower end of this plug depending below the end 79 within the path of upward movement of the valve stem 75 so as to engage the latter and unseat its lower valve 74 when the valve tube 71 moves upwardly with the upward flexure of the diaphragm 39 in case of pressure within the pressure chamber 36 below the diaphragm exceeding the pressure of the diaphragm controlling spring 77.

The upper closed end of the spring housing 35 is also provided with a series of apertures clustered around its center for the reception of freely movable adjusting pins 81 whose lower ends engage the flanged sleeve 78 at the upper end of the controlling spring 77, and whose upper ends are engaged by the upper head 82 of an adjusting cap 83 telescoping the spring housing 35 in freely adjustable vertical movement through which the effective pressure of the diaphragm controlling spring 77 is thus controlled.

The upper head 82 of the adjusting sleeve 83 has a central opening and in this opening the lower end of an upstanding whistle tube 84 is threaded, this latter whistle tube being preferably of either a different size or different arrangement with respect to the whistle 67 so that the two whistles will produce readily distinguishable sounds for a purpose which will clearly appear in the description of the operation.

I have shown in Figure 12 the applying or service chuck or head 85 connected in practice with the free end of the service line or hose 26, and which has for this purpose a laterally projecting nipple 86. The body of this chuck is axially bored at right angles to the nipp'e 86 and has an apertured web 87 intermediate the ends of the body, leaving a lower bore 88 by which to receive the upper end of a tire valve stem below the web 87. This web is centrally apertured and the upper end of this aperture forms a valve seat therearound on which a valve 89 is normally seated by its controlling spring 90, valve 89 having a depending stem 91 which projects into the lower bore 88 for engagement with the valve pin of a tire valve stem when the chuck is thrust upon the latter. This depending stem 91 is axially bored and, below the valve 89 has lateral openings so that when the valve 89 is lifted and unseated by virtue of its engagement with the tire valve pin in use, the service hose 26 attached to the nipple 86 will be in communication with the bore 88 and thus in communication with the interior of the tire valve stem. The valve 89 also has an upstanding guide stem 92 having bearing in a cap 93, the latter provided with a depending tubular extension 94 around the stem 92, with which the valve 89 is engageable when unseated to limit its upward movement and thus enable the downwardly projecting bored stem 91 to force the valve pin of the tire valve stem inwardly to open position. Thus when the chuck is applied in use, the valve of the tire stem is opened and the pressure of the tire can flow to the air control mechanism or pressure can flow from the air control mechanism to the tire, depending upon whether the existing pressure of the tire is greater or less than the effective pressure of the diaphragm controlling spring 77.

Thus, if, when the chuck 85 is applied to the tire valve stem, the pressure within the latter is greater than the effective pressure of the diaphragm controlling spring 77 pressure will flow from the tire through the service hose 26 to the pressure chamber 36 of the body or casing 28 of the air control mechanism and, being greater than the effective pressure of the controlling spring 77, will force the diaphragm 39 to flex upwardly to the position shown in Figure 11. During this upward movement which carries with it, the valve tube 71, the upper end of the valve stem 75 will engage the adjustable plug 80 and thus the unloading valve 74 at the lower end of the valve tube 71 will be unseated and while open, will permit the pressure to exhaust around the stem 75 through valve tube 71 and from thence upwardly through the upper end 79 of the spring housing 35 and to the atmosphere through the whistle 84, the latter being sounded continuously during this unloading of tire pressure until the pressure of the tire falls to the point where it is overcome by the effective pressure of spring 77 which then returns the diaphragm to its normal or intermediate position. Upon return of the diaphragm the unloading valve 74 again seats and is held seated by the air pressure in chamber 36, and during all this time, it will be observed that on account of the upward movement of the diaphragm the main feed valve 43 is free to remain entirely closed.

On the other hand, when the chuck 85 is applied to a tire valve stem and the pressure within the tire is below that of the effective pressure of the diaphragm controlling spring 77, the latter will cause diaphragm 39 to flex downwardly, and stem 76 of the main feed valve 43 will be engaged and depressed, shifting this valve downwardly off of its seat so that the feed line 51 will thus feed pressure to the chamber 36 and from the latter to the service line 26. As above described, the instant feed valve 43 opens the whistle valve 62 also opens so that during the passage of pressure from the feed line 51 through the air control mechanism to the service pipe or hose 26, the whistle 67 will be continuously sounded and will not cease until pressure is built up in the tire to the point where it overcomes the effective pressure of the diaphragm controlling spring 77. Thereupon the diaphragm will return to its normal position and the feed valve 43 and whistle valve 62 will again shift to closed position under tension of their springs 44 and 64.

By forming the whistles 67 and 84 differently, that is, either different arrangement of the parts or different sizes and thus insuring different sounds or signals, the operator is instantly advised upon the application of the chuck 85 to the tire valve stem whether pressure is being supplied to the tire or unloaded therefrom, and it is obvious that this is determined not only by the existing pressure of the tire itself, but by the control of the effective pressure of the diaphragm springs 77 through vertical adjusting movements of the cap 83.

The adjustment of the cap 83 as just above mentioned is carried out in practice with certain connections including a U-shaped bracket 95 seen particularly in Figures 2 and 3, whose upper arm 96 is apertured to engage the top 82 of cap 83 and to surround a whistle tube 84, and the lower end of which, below the air control apparatus, as indicated at 97, is adjustably engaged by the upper end of a connecting rod 98. As plainly shown in Figure 3, the said upper end of the rod 98 is threaded and receives nuts 99 and 100 respectively below and above the lower arm 97 of bracket 95 so that in the first instance a rough adjustment may be made through the use of these nuts.

The lower end of the connecting rod 98 is pivotally connected at 101 to the free end of one adjustable leaf 102 of a differential connection between rod 98, pointer 21 and the shaft 24 previously described as projecting at its outer end forwardly of the stand 15 and provided at its said outer end with lever 22. The adjustable leaf 102 is pivotally mounted at its opposite end as at 103 upon one face of a crank arm 104 fast upon the inner end of the shaft 24, and said leaf has intermediate its ends an arcuate slot 105 disposed generally in a transverse direction, through which a clamping screw 106 extends from the adjacent face of the crank arm 104. Through manipulation of this clamping screw 106, the pivotal connection 101 at the free end of the leaf 102, and between the latter and the connecting rod 98, may be shifted toward and away from the axis of a shaft 24.

The pointer 21, operating on the dial 107 is mounted as best seen in Figure 2, upon a shaft 108 having thereon a gear 109 engaged by the upper rack 110 of an upright bar 111. This bar is engaged adjacent to its upper end within the stand by a spring 112 anchored within the stand which serves to keep the upper rack 110 of the bar in engagement with the gear 109 at all times so that vertical movements of the rack bar will bring about rotation of shaft 108 and will consequently swing the pointer on the dial. The lower end of the rack bar 111 is pivotally connected at 113 to the free end of a second adjustable leaf 114 which latter is pivotally jointed at its opposite end to the crank arm 104 by the same pivot 103 which joins one end of the adjustable leaf 102 to this crank arm. Likewise the adjustable leaf 114 connected to the rack bar 111 has a clamping screw 115 intermediate its ends which is shiftable in an arcuate slot 116 of the crank arm 104 and thus the pivot 113 between the free end of the leaf 114 and the rack bar 111 may be adjusted toward and away from the center of the shaft 24.

The differential connection just described between the shaft 24, pointer 21 and the adjusting cap 83 of the air control mechanism, obviously permits of a differential movement as between the pointer actuating rack bar 111 and the cap actuating bracket 95, it being necessary that the latter have a short stroke of movement as compared to that of the rack bar 111. Moreover, a differential connection of the character specified obviously permits of independent adjustment of the stroke of the pointer actuating and cap adjusting connections and this fact together with the adjustment between the upper end of the connecting rod 98 and the lower end of the cap actuating bracket 95 permits of shifting the connections relative to one another so that the pointer 21 will in its movement indicate exactly the pressures on the dial to which the adjusting cap in its various positions is set.

All that it is necessary for the operator to do in utilizing the apparatus of my invention, is to grasp lever 22 and shift the same so that the pointer indicates the pressure at which the tire or tires are to be inflated. It is then only necessary for the operator to place the chuck 85 upon the tire valve stem and it is obvious that the parts operating as previously described, will either automatically inflate the tire to the desired pressure or unload the same to the desired pressure, and that during either the inflating or unloading of the tire, a signal will be sounded continuously which can easily be identified by the operator as denoting either inflation of the tire or unloading thereof.

Moreover, as to the signals, it is apparent that they are not only easily distinguishable from one another, but it is also apparent that they will be unfailing in their action, utilizing as they do, the same medium as that being controlled through the apparatus. If the apparatus itself is in action, it is to be presumed that the signals will also be properly in action. This as well as the other features of my invention, including the details of construction of its parts as well as the connections and relative arrangement of these parts insure a strong, durable apparatus as a whole, as well as one capable of ready adjustment, easy and quick repair in case repair becomes necessary, and an apparatus which will be uniformly effective and efficient and at the same time simple and inexpensive as compared to other apparatus now used for similar purposes.

It is furthermore apparent, and is to be appreciated from a practical standpoint that the manner of controlling the supply of air to the service line, or in other words, the manner of cutting off this air supply when a certain pressure has been reached in the service line bears such a relation to the means controlling the sounding of the signals that the absence of either of the whistles or their failure to operate for any other reason, has no effect whatever upon the inflation or deflation of a tire. In other words, the operator cannot, owing to the automatic and positive seating of the cut-off valves overinflate a tire or rather inflate the same above the set pressure nor can the tire deflate below the set pressure because when the set pressure has been reached, all of the valves will be closed irrespective of whether or not the whistles have sounded during the actual inflation or deflation period.

I claim :—

1. In an air service apparatus, an air controlling mechanism having an air inlet and outlet and a pressure chamber with which the outlet is in open communication, a feed valve normally seated between the inlet and the pressure chamber, a spring actuated diaphragm disposed in and controlled by the pressure within said pressure chamber and movable in one direction by its actuating spring to open the said feed valve, a pressure actuated audible signal having a pressure feed channel, and a valve controlling said channel and in adjustable connection with the feed valve for simultaneous opening movement therewith whereby the signal is sounded as long as the feed valve is open.

2. In an air service apparatus, an air controlling mechanism having an air inlet and outlet and a pressure chamber with which the outlet is in open communication, a feed valve normally seated between the inlet and the pressure chamber, a spring actuated diaphragm disposed in and controlled by the pressure within said pressure chamber and movable in one direction by its actuating spring to open the said feed valve, a pressure feed channel, a valve controlling said channel and having an abutment member adjustable thereon, and a member forming a connection between the adjustable abutment member of said signal valve and the feed valve whereby to insure simultaneous opening of these valves and also insure sounding of the signal as long as the feed valve is open.

3. In an air service apparatus, an air controlling mechanism having a pressure chamber and an air inlet opening centrally into the base of the pressure chamber, a feed valve seated upwardly adjacent to the base of the pressure chamber and normally cutting off the flow of air from the inlet to the pressure chamber, said mechanism also having an air outlet in open communication with the lower portion of the pressure chamber at one side thereof, a spring actuated diaphragm mounted in the pressure chamber with its lower face exposed to the pressure therein and having means to engage and depress the feed valve to open position, a pressure actuated audible signal having a feed channel, the pressure receiving end of which opens downwardly below the feed valve, a signal control valve seated upwardly in the receiving end of said channel, a flanged sleeve threaded on the signal valve, a controlling spring for the signal valve, one end of which engages said sleeve, a controlling spring for the feed valve, and a pin whose upper end is engaged with the feed valve and whose lower end engages the adjustable flanged sleeve of the signal valve for the purpose described.

4. In an air service apparatus, an air control mechanism having a pressure chamber and an air inlet and outlet of which the latter is in open communication with the pressure chamber, a diaphragm within the pressure chamber above its inlet and outlet, a feed valve controlling inlet of pressure to said chamber and movable downwardly to open position upon downward movement of the diaphragm, an actuating spring exerting a downward pressure on the diaphragm, a valve tube rising through the diaphragm and movable upwardly therewith, a valve seated upwardly within the lower end of said tube and having a stem projecting upwardly through and above the tube, an adjustable abutment for engagement with the upper end of said stem to force the last mentioned valve open when the diaphragm moves upwardly, and an audible signal arranged to receive pressure when the last mentioned valve is opened.

5. In an air service apparatus, an air control mechanism having a pressure chamber and an air inlet and outlet of which the latter is in open communication with the pressure chamber, a diaphragm within the pressure chamber above its inlet and outlet, a feed valve controlling inlet of pressure to said chamber and movable downwardly to open position upon downward movement of the diaphragm, an actuating spring exerting a downward pressure on the diaphragm, a valve tube rising through the diaphragm and movable upwardly therewith, a valve seated upwardly within the lower end of said tube and having a stem projecting upwardly through and above the tube, an adjustable abutment for engagement with the upper end of said stem to force the last mentioned valve open when the diaphragm moves upwardly, a housing for the spring in the portion of which said abutment is mounted, and means for adjusting the effective pressure of the diaphragm actuating spring including a cap movable on the housing and having a pressure outlet, and a pressure actuated audible signal mounted in the outlet of the adjusting cap as described.

6. In an air service apparatus, an air controlling mechanism having an inlet and an outlet, a pair of audible air actuated signals distinguishable in sound from one another, valves controlling the passage of air to said signals, a spring actuated pressure controlled diaphragm arranged to continuously hold one of said valves open during movement of the diaphragm in one direction and to continuously hold the other valve open during movement of the diaphragm in the opposite direction, and a main feed valve controlling the passage of air from the inlet to the outlet, movable to open position upon movement of the diaphragm in one direction and seatable independently of the signal control valves, and said feed valve having means forming a positive connection between the same, during its opening movement and one of said signal valves.

7. An air service apparatus including a service line, a feed line, an adjustable pressure air controlling mechanism therebetween having means for cutting off the flow to the service line when a predetermined pressure in the latter has been reached, an indicator for the said pressure of said mechanism, and manually adjusting means for the set pressure having connections for simultaneously adjusting the said air controlling mechanism and the said indicator, said connections including mechanical means adjustable by hand to vary the movement of the indicator with respect to the adjustable parts of the air controlling mechanism.

8. An air service apparatus including a service line, a feed line, an air controlling mechanism therebetween having means to cut off flow of air to the service line when a set pressure in the latter has been reached and also including a member for adjusting the set pressure of the mechanism, means for indicating the set pressure of the air controlling mechanism, a manually actuated control lever, a bracket engaging said adjusting member at one end, a connecting rod adjustably connected at one end to the other end of the bracket and having an adjustable connection at its opposite end with the said lever whereby to vary its stroke with respect to that of the lever, a movable indicator arranged to show the set pressure of the air control mechanism, and connections for operating said indicator from said lever adjustably in connection with the latter.

9. An air service apparatus including a service line, a feed line, an air controlling mechanism therebetween having means to cut off the flow of air to the service line when a predetermined pressure in the latter has been reached, an adjusting member for regulating the pressure at which said mechanism cuts off, a control lever, a shaft upon which said lever is mounted having a crank arm, a bracket, one end of which engages the adjusting member of the air control mechanism, a connecting rod one end of which is adjustably in connection with the other end of said bracket, a movable indicator arranged to show the set pressure of the air controlling mechanism, a rod for actuating the said movable indicator, and differential connections between said rods and the crank of the said shaft including a pair of leaves each pivoted at one end to the outer portion of the crank arm and each pivotally united at its opposite end to one of the rods, said leaves being adjustably in connection intermediate their ends with the said crank arm.

WILLIAM A. HARRIS.